Figure 1:
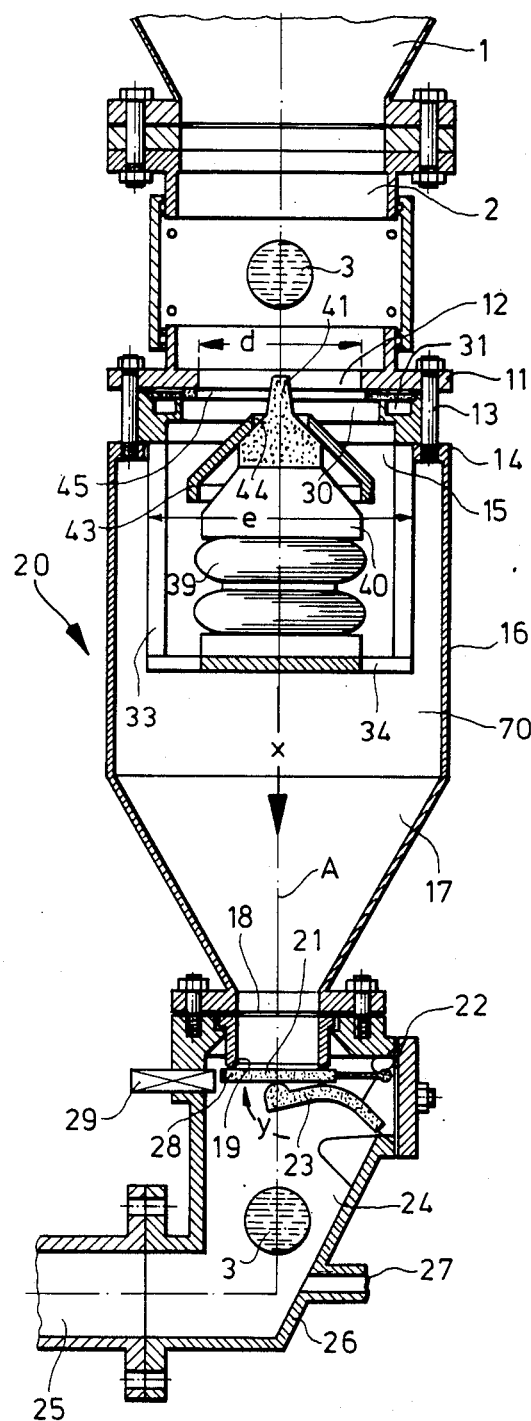

United States Patent [19]

Federhen et al.

[11] Patent Number: 4,674,922
[45] Date of Patent: Jun. 23, 1987

[54] APPARATUS AND PROCESS FOR CONTROLLING A CHARGING OPERATION FOR A FEED OF PARTICLES OF BULK MATERIAL

[76] Inventors: Bernd Federhen, 5900 Siegen 21; Manfred May, 5241 Niederfischbach; Gerhard Müller-Späth, 5905 Freudenberg-Oberfischbach, all of Fed. Rep. of Germany

[21] Appl. No.: 739,617

[22] Filed: May 31, 1985

[30] Foreign Application Priority Data

Jun. 2, 1984 [DE] Fed. Rep. of Germany ....... 3420616

[51] Int. Cl.$^4$ .................................... B65G 53/36
[52] U.S. Cl. .................................... 406/126; 137/240; 137/630; 222/148; 222/442; 222/450; 406/131; 406/132; 414/221
[58] Field of Search .................... 406/24–26, 406/29, 32, 124–126, 131, -133; 222/148, 517, 442, 450; 414/221; 137/240, 630, 630.14, 630.15

[56] References Cited

U.S. PATENT DOCUMENTS

| | | | |
|---|---|---|---|
| 1,186,423 | 6/1916 | Morris | 222/517 |
| 1,802,205 | 4/1931 | Fox et al. | 137/240 |
| 2,032,367 | 3/1936 | Kennedy et al. | 406/25 |
| 2,439,861 | 4/1948 | Pootjes | 222/445 |
| 3,094,249 | 6/1963 | Pullen | 406/132 |
| 3,133,554 | 5/1964 | Joebken | 137/240 |
| 3,542,255 | 11/1970 | Oetiker | 137/630.14 X |

FOREIGN PATENT DOCUMENTS

| | | | |
|---|---|---|---|
| 3144592 | 5/1983 | Fed. Rep. of Germany | 406/124 |
| 29338 | 3/1933 | Netherlands | 406/126 |

*Primary Examiner*—Jeffrey V. Nase
*Attorney, Agent, or Firm*—Bachman & LaPointe

[57] ABSTRACT

An apparatus having a charging lock chamber which can be alternately closed off with respect to a supply container by a movable closure head and an annular sealing edge in opposite relationship thereto as a seat therefor, on the one hand, and from a pneumatic conveyor conduit by a flap, on the other hand, for charging a feed of particles of bulk material into the conveyor conduit, is to require inter alia only one conveyor vessel for the virtually continuous conveying of bulk material, is not to require a metering device disposed at an upstream location, and is also to be suitable for conveying pressures of around 6 bars. That is achieved in that associated with the sealing edge is at least one annular feed duct for a curtain of air which is directed towards the closure head, and that the flap which is pivoted at one end has a force storage device engaging beneath it and in its closure position bears against the substantially horizontal edge of a mouth opening (18) of the charging lock chamber. Disposed downstream of the flap is an air feed device for the conveyor conduit and the sealing edge is provided on a resilient sealing ring which extends over an annular groove and which provides a wall portion of the feed duct, which wall portion can be deformed by means of air fed thereto in such a way that said sealing ring is at a spacing from an edge of the annular groove, thereby forming a blowing gap.

12 Claims, 9 Drawing Figures

APPARATUS AND PROCESS FOR CONTROLLING A CHARGING OPERATION FOR A FEED OF PARTICLES OF BULK MATERIAL

The invention relates to an apparatus having a charging lock chamber for charging a feed of particles of bulk or loose material from a supply container or the like into a pneumatic conveyor conduit, wherein the charging lock chamber is adapted to be closed off alternately on the one hand with respect to the supply container by means of a movable closure head and an annular sealing edge which is in opposite relationship thereto as a seat therefor, and on the other hand with respect to the conveyor conduit by means of a flap. The invention also concerns a process for charging a feed of material into a pneumatic conveyor conduit by means of the above-indicated apparatus.

An apparatus of the kind set forth above is disclosed in German laid-open application (DE-OS) No. 31 44 592 with which it is possible to produce a virtually continuous conveying flow if a plurality of apparatuses are alternately connected successively into the conveying operation. Such a system is known from installations which are referred to as tandem installations, and it requires a considerable level of apparatus expenditure. The closure means used therein is a cone member which can be lifted by pneumatic means and with which there is associated, at corresponding expense, an upstream-disposed cone-type closure means with which a feed of material into a metering chamber must be controlled.

Having regard to those considerations, the inventors set themselves the object of providing an apparatus for the almost continuous conveying of bulk or loose material, which requires only one conveyor vessel and which does not need an upstream-disposed metering means. The invention also seeks to make the apparatus suitable for conveying pressures of around 6 bars, and to make it possible to make optimum use of the energy supplied for the pneumatic conveying operation, to ensure operating security and safety in all operating states and to operate in a substantially wear-free fashion. Another object of the invention is to make both the apparatus and also the process which is to be carried out therewith inexpensive.

That object is achieved in that associated with the sealing edge is at least one annular feed duct for a screen or curtain of air which is directed towards the closure head, and that the flap which is pivoted at one end has a force storage means engaging thereunder and in its closure position bears against the substantially horizontal edge of a mouth of the charging lock chamber.

In addition, an air feed means for the conveyor conduit is to be disposed downstream of the flap.

In accordance with a further feature of the invention, the sealing edge is provided on a resilient sealing ring which extends over an annular groove and which provides a wall portion of the feed duct, which is deformable by means of the feed air in such a way that the sealing ring is disposed at a spacing from an edge of the annular groove, thereby forming a blowing or blast gap. In accordance with the invention, the thickness of the sealing ring at the sealing edge is greater than its thickness at a radial spacing from the sealing edge, with the result that, when air is blown against the sealing ring, the sealing ring becomes curved slightly upwardly and, with a surface which extends thereover and which acts as a support means, forms said blowing or blast gap.

The above-described movement of the sealing ring is further improved if it is of U-shaped cross-section and the limb portions of its U-shape bear against said support surface. That arrangement thus provides a channel-like configuration, the free space of which is delimited by a thin, comparatively flexible wall portion against which the blowing air is directed in the manner described.

It has been found to be desirable from the design configuration aspect for the annular groove to be disposed in a shaped ring, beneath which is fixed a holding frame structure for the closure head. The closure head is preferably of a dish-like configuration or is in the form of a deep bowl, and is supported freely on a vertically extending carrier. In accordance with the present invention, for the purposes of improved venting, provided in the closure head is a central opening into which extends a sealing tip portion of the carrier, advantageously a bellows cylinder; the fact that the carrier is formed as a bellows cylinder arrangement gives the advantage that on the one hand it is actuated with the flow agent which also generates the blast or blowing air flow so that both the vertical movement of the carrier and also the blowing effect of the air can be produced by means of a single control process. On the other hand, the bellows cylinder arrangement is substantially wear-free in operation.

In accordance with the invention, the outlet of the charging lock container is formed by a flap which, in the closure position, is in opposite relationship to a sensor or a corresponding pick-up means which is connected to a control member for the feed of air to the sealing edge on the one hand and actuation of the bellows cylinder arrangement on the other hand, in order to trigger off the above-described operations. Furthermore, the sensor is to be connected to a time relay in order to be able to control the filling process.

By virtue of the above-described features, there is provided an apparatus for pneumatically conveying bulk or loose materials, which can also be used for conveying pressures of around 6 bars, which permits quasi-continuous conveying and which, in accordance with the object of the invention, affords a simple and inexpensive design configuration. The following are to be considered as essential characteristics:

short filling time, small size, small amount of waste or discharge air;

a secure and pressure-tight closure even when the conveying vessel is completely filled, gentle relief of the conveying pressure, when operating under high pressure, security from control malfunctions, good accessibility, no discharge of air from the system through a cone closure means which is flooded by means of compressed air, with integrated vent valve; and reliable, low-wear actuation of the closure system by a problem-free bellows cylinder arrangement as a carrier means or a closure drive means.

In the filling phase, the conveyor conduit is sealed off with respect to the charging lock container while the conveying action is continued in the conveyor conduit. Bulk material and conveying air which are present in the conveyor conduit or which are introduced thereinto still continue to flow to the receiving vessel, in the phase of filling of the charging lock container. The fact that the conveying flow is made more uniform and the fact that the amount of discharge or waste air is reduced result in a considerable saving of energy, the described flap at the outlet serving in particular for that purpose.

Control is effected by components which are designed for multiple functions, with coupling of mechanical and pneumatic functions. The system does not include sensitive means for monitoring the level of filling, and the level of expenditure on electrical control means is slight.

Figure 2:
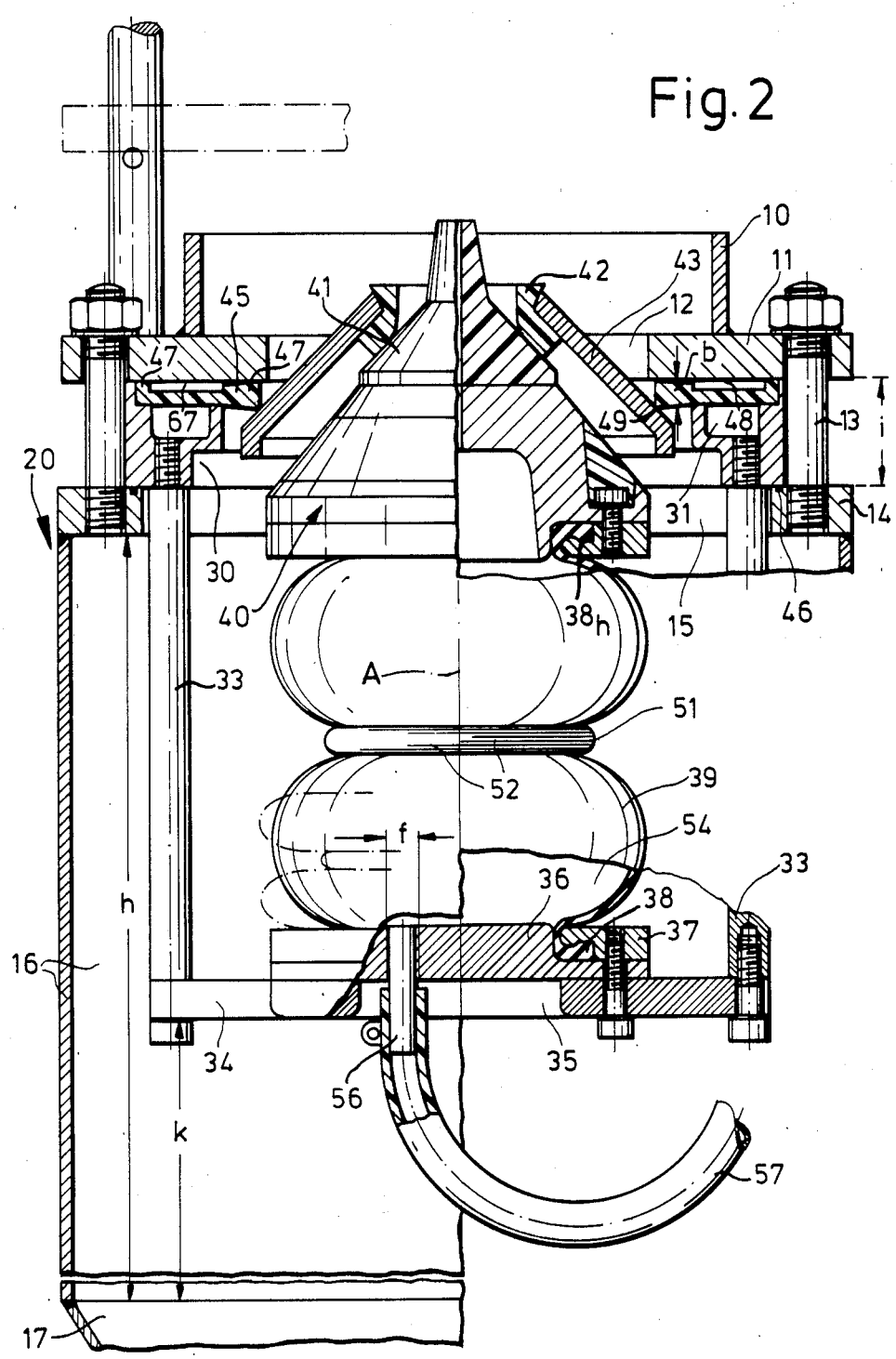
Figure 4:
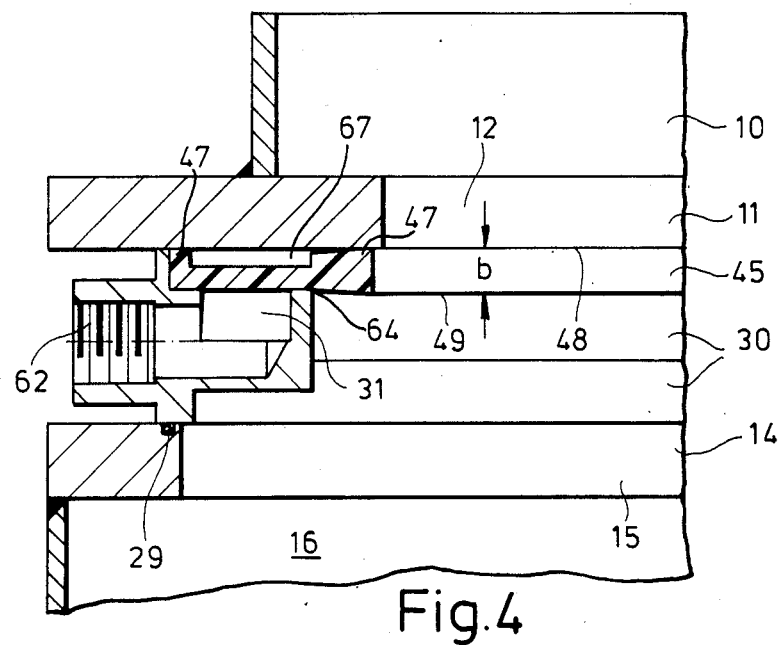
Figure 3:
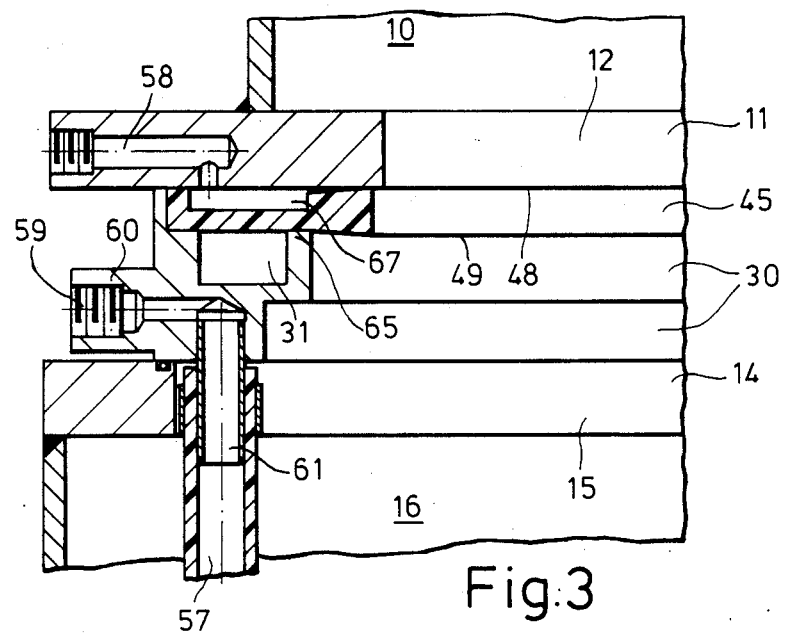
Figures 5, 6:
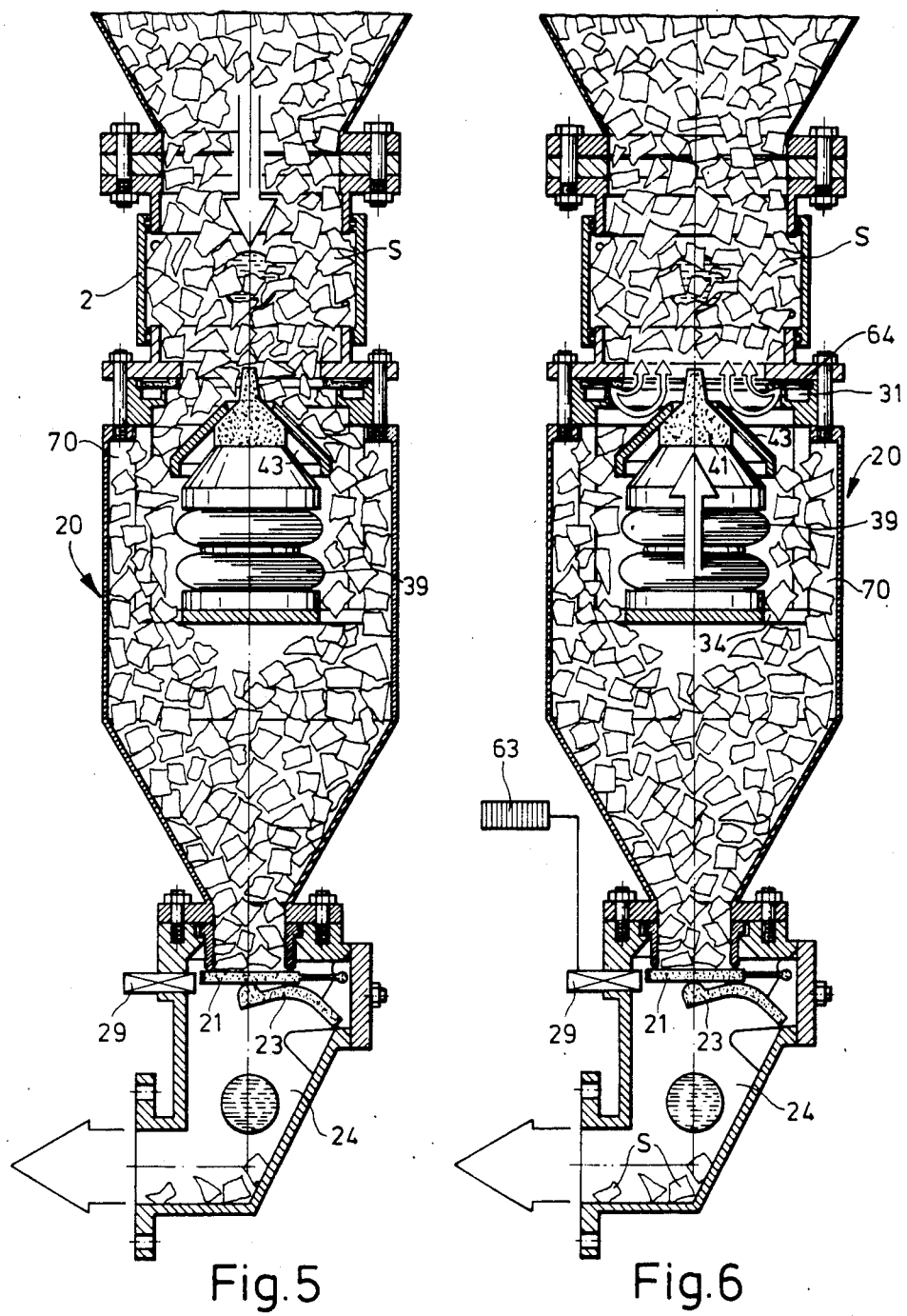
Figure 7:
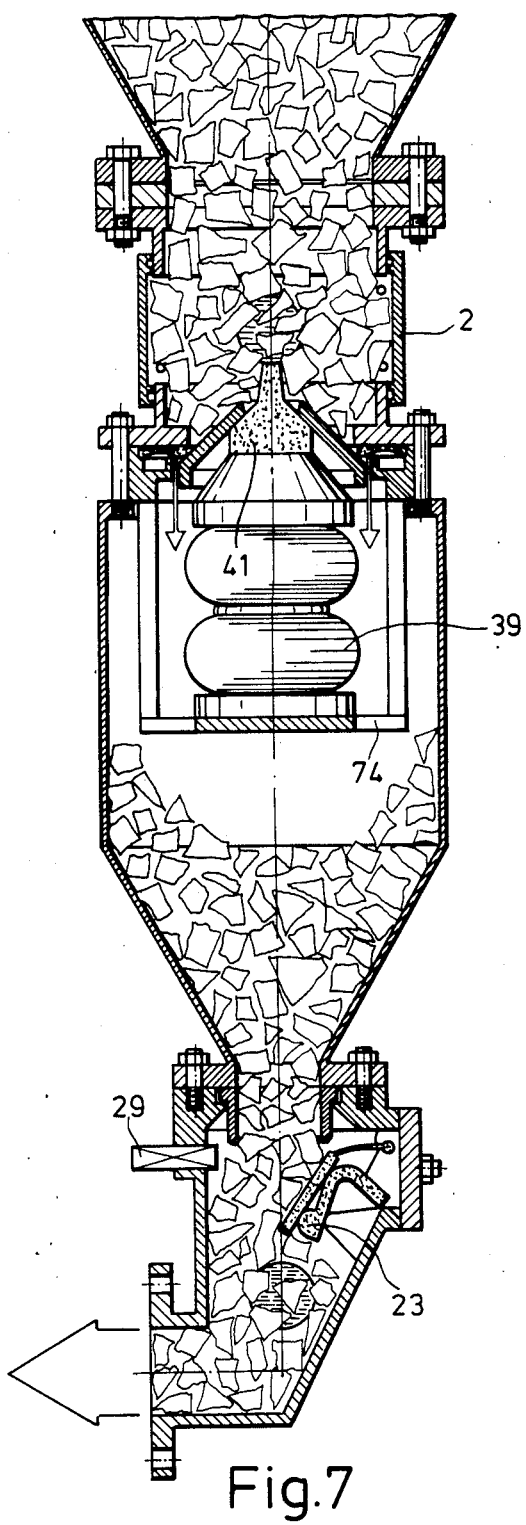
Figure 8:
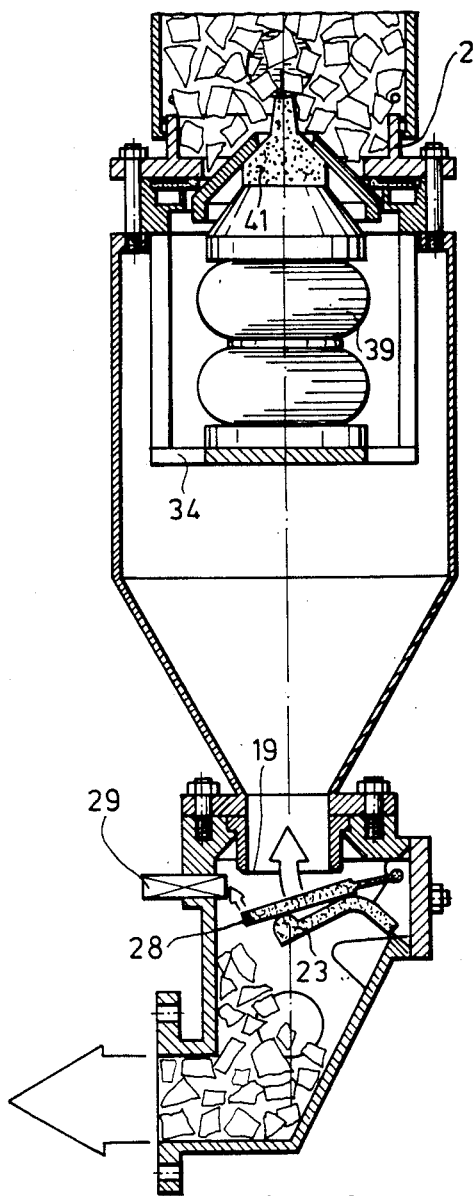
Figure 9:
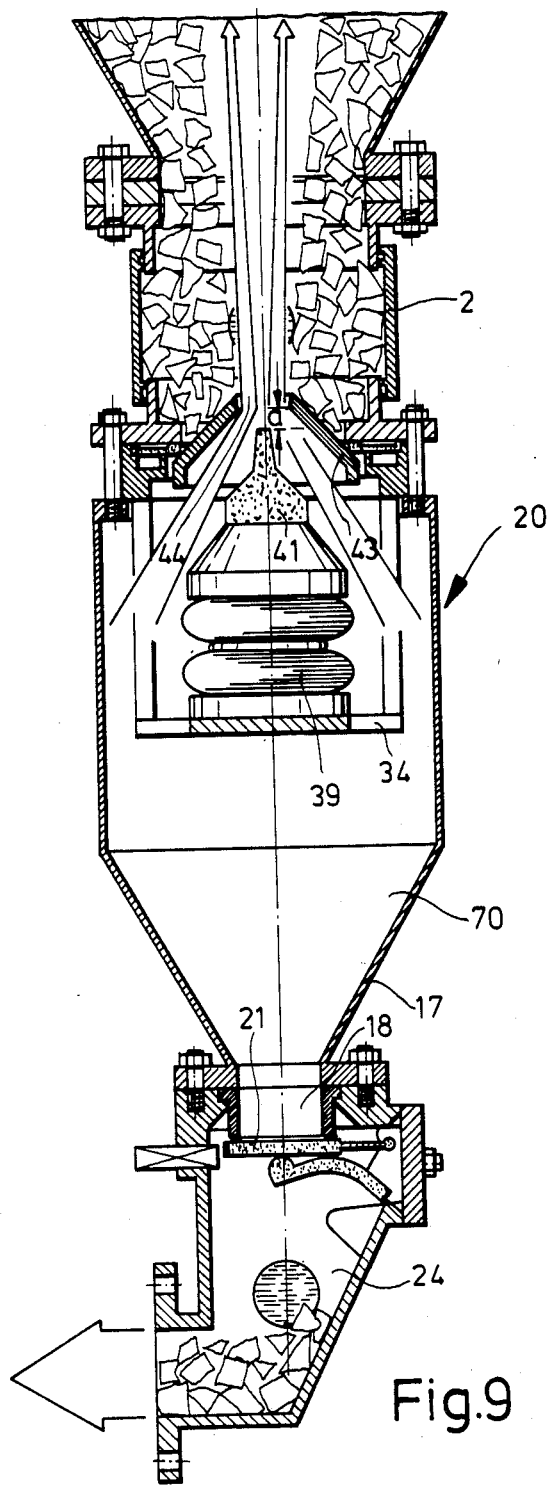

Further advantages, features and details of the invention will be apparent from the following description of preferred embodiments and with reference to the accompanying drawings in which:

FIG. 1 shows a diagrammatic view in longitudinal section through an apparatus according to the invention with a charging lock container having an upper closure head and a lower outlet flap, FIG. 2 shows a portion of the arrangement illustrated in FIG. 1, on an enlarged scale with respect thereto, FIG. 3 shows a view on a larger scale than FIG. 2, of a detail in section along another section line, FIG. 4 shows a further detail from FIG. 2, FIG. 5 shows a view of the apparatus corresponding to that shown in FIG. 1, with a filled charging lock container and with the closure head in the lowered position, FIG. 6 shows the apparatus during a blowing-in phase at the closure head, FIG. 7 shows the apparatus with the closure head in the closed condition and the discharge flap in the open condition, FIG. 8 shows the emptied charging lock container, and FIG. 9 shows venting of the charging lock container through an opening in the closure head.

Referring firstly to FIG. 1, shown beneath a storage or supply container as indicated at 1 for bulk or loose material in dust or grain form is a tubular connecting portion 2 with a sight glass 3. The connecting portion 2 is fixed on a carrier plate 11 in coaxial relationship relative to the longitudinal axis as indicated by A. The plate 11 has a central opening 12 with a diameter as indicated at d of for example 155 mm.

Secured to the carrier plate 11 by means of screw bolts 13 at a spacing as indicated at i is a holding or mounting plate 14 with an opening 15 which is larger than the opening 12, the diameter e of the opening 15 being 255 mm in this embodiment. Adjoining the mounting plate 14 is a wall 16 of a charging lock container 20 which, at a spacing h of 350 mm from the mounting plate 14, blends into a tapering or conical discharge portion 17 of which only part is shown in FIG. 2. The portion 17 terminates downwardly in a discharge connecting portion 18 having an annular horixontal edge 19 around its mouth.

Disposed downstream of the discharge connecting portion 18, as considered in the direction of conveying movement x, is a discharge flap 21 which is pivotally mounted at its side as indicated at 22 and which, in the closure position illustrated in FIG. 1, is urged by a spring 23 against the edge 19 of the mouth opening of the connecting portion 18, thus constituting a sealing seat therefor, when the pressure in the container 20 is lower than the conveying pressure in a conveyor conduit 25 which is connected to a discharge housing 24 at the side thereof. Disposed opposite the conveyor conduit, in an inclined side wall 26 of the discharge housing 24, is a feed conduit 27 for conveying air.

During a pivotal movement of the discharge flap 21 towards the closure position as indicated by the arrow y, the discharge flap 21, by means of an end member or portion 28, actuates a switch 29 for a venting operation which is still to be described herein. The switch 29 can be triggered in a non-contact fashion and operates inductively, capacitively, magnetically or optically.

Between the mounting plate 14 and the carrier plate 11, a rigid shaped ring 30 having an upwardly open annular groove 31 bears against a sealing ring 46 which is of limited resiliency. Fixed beneath the annular groove 31 are mounting bars 33 of a base plate 34, the arrangement being such that the spacing k thereof from the conical discharge portion 17 approximately corresponds to the dimension of the diameter d of the opening 12.

Fixed over a central opening 35 in the base plate 34 is a bottom plate 36 to which the lower edge 38 of a bellows arrangement 39 is connected by means of a clamping ring 37. The upper edge $38_h$ of the bellows arrangement 39 is fitted into a conical or tapered head 40. The tip portion 41 of the head 40, said tip portion comprising a material of limited resiliency, bears against a collar portion 42 of a dish-like closure head 43 which tapers in an upward direction, the closure head 43 having a central opening 44 for accommodating said collar 42.

In the closure position shown in FIGS. 2, 7 and 8, the closure head 43 bears closely against a shaped channel member 45 which extends over the annular groove 31 in the ring 30 and which bears by means of its limb portions 47 against the underside 48 of the carrier plate 11. The inner edge 49 of the channel member or sealing ring 45 forms a sealing edge, from which the thickness b of the cross-section of the sealing ring decreases in a radial outward direction.

As already stated hereinbefore, said bellows arrangement 39 extends from the tapered head 40 to the bottom plate 36, the bellows arrangement 39 having a constriction 51 in which a ring 52 is disposed.

Extending through the bottom plate 36 is a connecting tube or sleeve 56, of a diameter f of 12 mm, for connecting an air hose 57 with which the space 54 inside the bellows arrangement 39 can be filled with air and vented.

Referring to FIG. 3, shown therein in the carrier plate 11 is a vent bore 58 for a duct chamber 67 on the sealing ring or channel member 45, a bore 59 provided in a portion 60 formed on the ring 30; the bore 59 communicates with a hose connection 61 for the air hose 57. In addition, the ring 30 is provided with a further connection 62 for the annular groove 31, as shown in FIG. 4.

In the filling process which is illustrated in FIG. 5, the interior 70 of the charging lock container 20 is filled with the closure head 43 in the lowered position.

The discharge flap 21 in the discharge housing 24 is pressed against the sealing surface or the edge 19 of the mouth opening of the discharge connecting portion 18, by the closing spring 23 and the air pressure obtaining in the conveyor conduit 25. The bulk material S flows in and the process can be observed through the sight glass 3 in the intake connecting portion 2.

After expiry of the filling time which can be set at a timing relay 63, as shown in FIG. 6, air which is introduced into the annular groove 31 as a feed duct and which issues in the form of a screen or curtain of air towards the closure head 43, from the gap 64 between the inner edge 65 of the groove 31 and the sealing ring 45 which is deformed in that stage of the process blows material away from the space around the entry cone or closure head 43. At the same time, by virtue of the bellows arrangement 39, the closure head 43 rises and seals off the interior 70 of the container 20 from the intake connecting portion 2.

The air which continues to flow in builds up the conveying pressure in the container 20.

When the pressure in the container 20 is as high as the pressure in the conveyor conduit 25, the discharge flap 21 is opened and the bulk or loose material S flows into the conveyor conduit 25.

When the level of bulk material or product drops below the discharge flap 21, the flap 21 is lifted against the sealing seat 19 by the spring 23.

The air which then continues to flow out of the container 20 cleans the flap surface. When the flat 21 actuates the switch 29, the air feed is cut off by valves (not shown) which are controlled by the switch 29, the bellows arrangement 39 is vented and the sealing tip portion 41 is pulled out of the opening 44 of the entry cone member or closure head 43. The latter is held against the member 45 or the cone sealing means, by the air pressure which still obtains in the container 20, until the increased pressure has been reduced by way of the opening 44 in the closure head 43. The arrows in FIG. 9 particularly clearly shown the flow path of the air as it is discharged, and FIG. 9 likewise shows the spacing a which is produced at this stage of the process between the dish-like closure head 43 and the sealing tip portion 41.

When the venting operation is concluded, the closure head 43 drops under its own weight on to the sealing tip portion 41 and the filling phase can begin again.

We claim:

1. An apparatus having a charging lock chamber for charging a feed of particles of bulk or loose material from a supply means into a pneumatic conveyor conduit which comprises a supply means, a charging lock chamber communicating with said supply means and downstream thereof, a valve head and an annular sealing edge in opposite relation thereto as a seat therefor adapted to close off the charging lock chamber with respect to the supply means, means for suspending a pneumatic carrier within said lock chamber, said carrier being operable to support said valve head and to move said valve head to an open and a closed position relative to said supply means, said valve head defining a sealing tip portion and a separable closure head operable as an assembly and independently to control access between said supply means and said chamber; at least one annular feed duct associated with said sealing edge operative to feed a curtain of air directed towards said closure head, a pneumatic conveyor conduit downstream of said charging lock chamber communicating therewith via a mouth opening with a substantially horizontal edge, a flap pivoted at one end operative to close off the charging lock chamber with respect to the pneumatic conveyor conduit wherein said flap in its closure position bears against said substantially horizontal edge, and a force storage means engaging said flap beneath same.

2. An apparatus according to claim 1, wherein said pneumatic conveyor conduit includes an air feed means downstream of said flap.

3. An apparatus according to claim 1, wherein said sealing edge is provided on a resilient sealing ring which extends over an annular groove and which provides a wall portion of said feed duct which wall portion is deformed by means of air applied thereto in such a way that the sealing rings is at a spacing from an edge of the annular groove, forming a blowing gap.

4. An apparatus according to claim 3, wherein the thickness (b) of the sealing ring at the sealing edge is greater than the thickness of the sealing ring at a radial spacing from the sealing edge.

5. An apparatus according to claim 3, wherein the sealing ring is of U-shaped cross-section and the limb portions of its U-shape bear against a support surface extending over the sealing ring.

6. An apparatus according to claim 3, wherein the annular groove is disposed in a shaped ring under which is fixed a mounting support structure for the valve head and the pneumatic carrier.

7. An apparatus according to claim 1, wherein the valve head includes a dished closure head and collar all supported on said carrier.

8. An apparatus according to claim 7, wherein said valve head has a sealing tip portion and said closure head has a central opening, with said sealing tip portion extending into said central opening.

9. An apparatus according to claim 1, in which the pneumatic carrier is of variable-length and a space within the carrier is connected to at least one fluid conduit, wherein the carrier is a resiliently deformable bellows and is fixedly connected to the sealing tip portion.

10. An apparatus according to claim 9, wherein said carrier projects up from a base plate which is fixedly connected to a shaped ring.

11. An apparatus according to claim 9, characterized in that disposed in opposite relationship to the flap in the closure position is a sensor or a corresponding pick-up means which is connected to a control member for the feed of air at the sealing edge on the one hand and for the carrier on the other hand.

12. An apparatus according to claim 11, wherein the sensor is connected to a timing relay or like element.

* * * * *